United States Patent [19]

Ueda et al.

[11] Patent Number: 4,479,063
[45] Date of Patent: Oct. 23, 1984

[54] AUTOMATIC ENGINE STOP-RESTART SYSTEM

[75] Inventors: Masahiro Ueda; Masahiko Noba; Osamu Hori; Kimitoshi Murata; Hatsuo Nakao, all of Toyota, Japan

[73] Assignee: Toyota Jidosha Kabushiki Kaisha, Toyota, Japan

[21] Appl. No.: 394,727

[22] Filed: Jul. 2, 1982

[30] Foreign Application Priority Data

Jul. 27, 1981 [JP] Japan ................. 56-117252

[51] Int. Cl.³ .............. F02N 11/00; H02P 1/04; H02P 5/16
[52] U.S. Cl. ................. 290/30 R; 290/DIG. 1; 290/DIG. 2; 290/DIG. 3; 290/DIG. 4
[58] Field of Search .............. 290/30 R, 30 A, 30 B, 290/34, 51, DIG. 1, DIG. 2, DIG. 3, DIG. 4; 318/443, 444, 483, DIG. 2; 123/198 D, 198 DB, 179 A, 198 DC

[56] References Cited

U.S. PATENT DOCUMENTS

| | | | |
|---|---|---|---|
| 2,064,358 | 12/1936 | Sayre | 290/DIG. 4 X |
| 2,930,901 | 3/1960 | Freeman | 290/30 R X |
| 3,047,725 | 7/1962 | Spinelli et al. | 290/30 R X |
| 3,142,793 | 7/1964 | Grillo | 290/30 R X |
| 3,786,330 | 1/1974 | Inoue et al. | 318/DIG. 2 X |
| 3,796,936 | 3/1974 | Kearns | 318/DIG. 2 X |
| 4,131,834 | 12/1978 | Blaszkowski | 18/DIG. 2 X |
| 4,314,186 | 2/1982 | Gille et al. | 318/DIG. 2 X |
| 4,317,073 | 2/1982 | Blaszkowski | 318/DIG. 2 X |
| 4,339,698 | 7/1982 | Kearns | 318/DIG. 2 X |
| 4,350,938 | 9/1982 | Ecole | 318/DIG. 2 X |

FOREIGN PATENT DOCUMENTS 573549 3/1976 Switzerland ............. 290/DIG. 1

Primary Examiner—J. V. Truhe
Assistant Examiner—Terry Flower
Attorney, Agent, or Firm—Oblon, Fisher, Spivak, McClelland & Maier

[57] ABSTRACT

An engine is automatically stopped under predetermined conditions, thereafter, restarted under other predetermined conditions. The conditions of automatically stopping the engine includes at least a stopped state of a wiper which is driven by two-speed typed motor. Operating condition of the motor for driving the wiper is detected by a signal from either a low terminal or a high terminal of the motor.

3 Claims, 2 Drawing Figures

AUTOMATIC ENGINE STOP-RESTART SYSTEM

BACKGROUND OF THE INVENTION

This invention relates to an automatic engine stop-restart system, and particularly to an automatic engine stop-restart system wherein automatic stop of an engine is prevented under predetermined conditions, so that operation of a vehicle can be facilitated.

In general, there are many cases where, during driving of a motor vehicle, the motor vehicle is required to be temporarily stopped due to various causes including a traffic jam and a red traffic light. In the case of temporary stop as described above, it is the common practice that, until the motor vehicle can move again, the motor vehicle is in the waiting state, idling the engine. When the temporary stops as described above are frequent, the fuel consumption rate is deteriorated and it is unfavorable from the viewpoint of the emission control. Then, each time of the temporary stop, the engine is manually stopped by means of a key switch, and, in moving the vehicle, the engine is manually started, thus enabling to solve the above-described problem. However, these manual operations suffer from low controllability and it is not favorable from the viewpoint of the safety control.

In view of the above-described facts, there has been proposed an automatic engine stop-restart system (hereinafter referred to as "EASS") wherein, in temporarily stopping the motor vehicle, the engine is automatically stopped, and thereafter, the engine is automatically restarted. In this EASS, for example, a status signal of a clutch pedal, an engine rotational speed signal, a vehicle speed signal, a water temperature signal, an oil pressure signal and other signals are taken in an electronic control circuit mainly consisting of a microcomputer. When conditions of stopping the engine are fulfilled, the functions of ignition means and a fuel system are stopped to thereby stop the engine annd when conditions of rotatably starting the engine are fulfilled, a starter is rotated to start the engine, so that the rotation of the engine can be maintained.

The engine is not automatically stopped in the following cases from the viewpoint of safety. (i) When the temperature of engine cooling water is lower or higher than a predetermined temperature, restart of the engine becomes difficult, and consequently, the engine is not stopped. (ii) While head lamps, a wiper and the like are used, electrical load is heavy, and consequently, the engine is not stopped. (iii) At the time of right turn, the engine is not stopped. Further, (iv) While an air conditioner is used, similarly, the engine is not stopped.

The use condition of the wiper in Item (ii) is divided into two including one use of the wiper in a high speed motion and the other use in a low speed motion, and hence, heretofore, there has been need to reliably detect the use of the wiper irrespective of the motions. Therefore, there has been practised that, based on utilization of a wiper motor during the use of the wiper, voltage signals from a high (high speed motion) terminal and a low (low speed motion) terminal of the wiper motor are taken into a control circuit, whereby the state of the wiper has been detected by the respective voltage signals. However, the above-described method has presented the disadvantages that two signal lines are required for the high speed motion and low speed motion and also two input ports are needed in the control circuit.

SUMMARY OF THE INVENTION

The present invention has been developed to obviate the disadvantages of the prior art and has as its object the provision of an automatic engine stop-restart system wherein circuits are simplified to decrease the costs and automatic engine stop is reliably prevented to improve the reliability.

According to the present invention, the engine is automatically stopped under predetermined conditions and thereafter automatically restarted under other predetermined conditions. A stopped state of the wiper is made to be at least one of the conditions of automatically stopping the engine, and the operating condition of the wiper is detected by a signal from either the low terminal or the high terminal of the motor driving the wiper. When it is judged from the signal taken out of either one of the terminals of the wiper motor that the wiper motor is stopped, is the other conditions of automatically stopping the engine are fulfilled, then the engine is automatically stopped. When a voltage is applied to the high terminal of the wiper motor, a voltage of a certain value is generated in the low terminal, and when a voltage is applied to the low terminal, a voltage of a certain value is generated in the high terminal. The present invention has been developed on the basis of the above-described characteristics of the wiper motor.

DESCRIPTION OF THE PREFERRED EMBODIMENT

Figure 1:
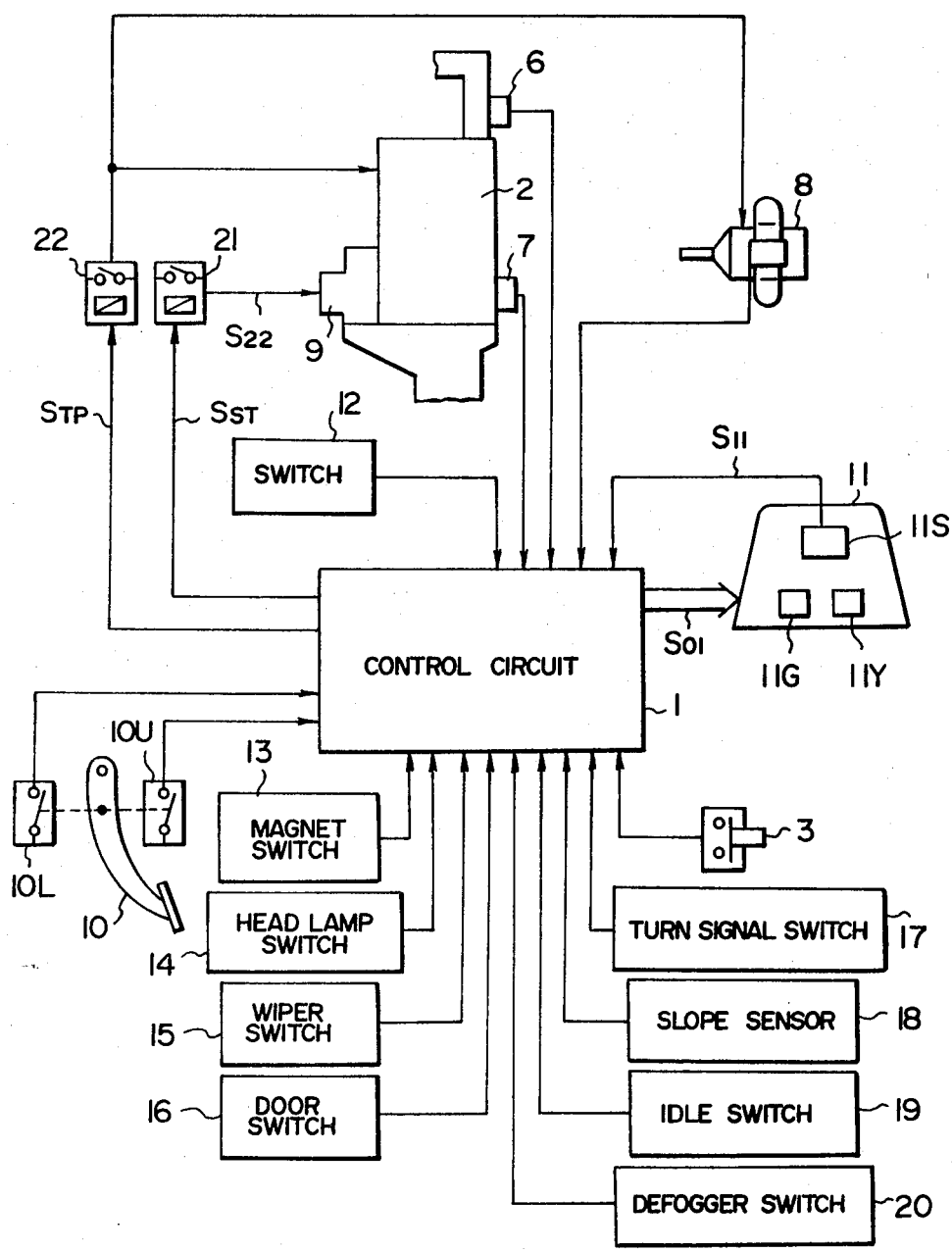
FIG. 1 is a block diagram showing the general arrangement of the automatic engine stop-restart system according to the present invention.

FIG. 1 is a block diagram showing the general arrangement of one embodiment of an automatic engine stop-restart system according to the present invention. In the drawing, an electronic control circuit 1 mainly consists of a microcomputer of 8 bits for example. In order to cause this electronic control circuit 1 to perform functions (hereinafter referred to as "ERS") of automatically stopping the engine, and thereafter, automatically restarting the engine, it is necessary to press a main switch 3 after the engine 2 has been started. The main switch 3 should be pressed again to manually release ERS which has been once set. On the other hand, when predetermined conditions are fulfilled, ERS is automatically released. As such predetermined conditions includes, opening of a door of a driver's seat, manual operation of a starter upon automatically stopping the engine and the like, for example. Detailed description thereof will be omitted because it has no particular relation to the present invention.

Brief description will now be given of an embodiment of the general arrangement of the automatic engine stop-restart system according to the present invention. The engine 2 is provided thereon with a water temperature sensor 6 for detecting whether the engine cooling water temperature is within a predetermined range or not and with an oil pressure switch 7 for detecting whether the oil pressure of the engine has reached a satisfactory level or not. Reference numeral 8 indicates an igniter for generating a high voltage for sparks igniting ignition plugs. An ON-OFF signal of this igniter 8 is fed to the control circuit 1 to detect an engine rotational speed. Signals from the water temperature sensor 6 and the oil pressure sensor 7 are taken into the control circuit 1. Similarly to the foregoing description, the engine 2 is provided thereon with a starter 9, which cranks the engine 2 to start it.

Reference numeral 10 indicates a clutch pedal, which is provided therearound with a clutch upper switch 10U interlocking with this clutch pedal 10 and a clutch lower switch 10L. Openings or closings of the clutch upper switch 10U and the clutch lower switch 10L transmit the depressed state of the clutch pedal 10 to control circuit 1. More specifically, the clutch lower switch 10L is turned ON when the clutch pedal 10 is substantially fully depressed, and the clutch upper switch 10U is turned ON when clutch pedal is depressed to a predetermined percentage of the full stroke of the clutch pedal, e.g., 30% of the full stroke. Furthermore, in an indicator panel 11, there are provided an operation indicating lamp 11G, an engine stop indicating lamp 11Y, a speedometer 11S as a vehicle speed sensor and other indicating means. An indication signal $S_{01}$ from the control circuit 1 is fed to the lamps 11G and 11Y to turn ON or OFF. A vehicle speed signal $S_{11}$ from the vehicle speed sensor 11S is taken into the control circuit 1. Taken in the control circuit 1 as necessary are signals from sensors, switches and the like including a change-over switch 12 for charging a battery with an output from an alternator, a magnet switch 13 for controlling the operation of an air conditioner, a head lamp switch 14 for ON-OFF operating the head lights, a wiper switch 15 for detecting the operating condition of the wiper, a door switch 16 for detecting the open or closed state of the door of the driver's seat, a turn signal switch 17 for detecting the right turning condition of the vehicle (the left turning condition of the vehicle under the "keep to the right" ordinance), a slope sensor 18 for detecting whether the slope of the road surface on which the vehicle is stopped is a predetermined value, e.g., 2° or more, and being turned ON when the slope is a predetermined value or more, an idle switch 19 for detecting whether the engine is in idling or not, and being turned ON when the engine is in idling, and a defogger switch 20 for detecting whether the defogger is in operation or not. Furthermore, a starter relay 21 is adapted to be operated by a starter starting signal $S_{ST}$ fed from the control circuit 1, and similarly, a fuel cut and ignition cut relay 22 is adapted to be operated by an engine stop signal $S_{TP}$ fed from the control circuit 1.

Brief description will hereunder be given of action of the automatic engine stop-restart system with the above-described embodiment. Firstly, the engine is manually started and the main switch 3 is pressed to set ERS.

Subsequently, when all the following conditions are fulfilled, the engine 2 is automatically stopped.
(1) The clutch pedal 10 is not depressed.
(2) The engine 2 is in idling, e.g., the rotational speed is 850±50 rpm or less.
(3) The vehicle is stopped, i.e., the vehicle speed $S_{11}$ is not varied for 2 sec, that is, 0.35 Km/H or less.
(4) A right turn signal has not issued from the turn signal switch 17.
(5) The head lamp switch 14 has not turned the head lamps ON (except for small head lamps).
(6) The wiper switch 15 is not in use (except for the intermittent operation).
(7) The water temperature sensor 6 is in OFF condition, i.e., the engine cooling water temperature is within the range of 75°±5° C.~105°±3° C. for example.
(8) The magnet switch 13 for controlling operation of a compressor for the air conditioner is OFF.
(9) A predetermined period of time after the start of the engine by ERS, e.g., 4 sec has elapsed.
(10) The slope sensor 18 is OFF.
(11) The idle switch 19 is OFF.
(12) The defogger switch 20 is OFF.
(13) The vehicle is not held stopped after the ERS is set.

All these conditions are fulfilled, the engine stop indicating lamp 11Y of the indicator panel 11 is turned ON to indicate the automatic stop of the engine.

The automatic stop of the engine 2 is effected by deenergizing the fuel cut solenoid and cutting OFF the ignition power source for feeding current to the igniters 8 for a predetermined period of time, e.g., 1 sec.

Description will now be given of operation of the automatic engine restart.

When the engine 2 is stopped after ERS has been set, if the clutch pedal 10 is substantially fully depressed to turn the clutch lower switch 10L ON, the starter relay 21 is energized to supply a current to the starter 9, so that the engine 2 can be restarted. Additionally, a signal from the clutch lower switch 10L is detected while the clutch is disconnected. When the engine rotational speed reaches a predetermined value, e.g., 450±50 rpm after the engine 2 has been restarted, the starter relay 21 is deenergized to cut off the current supply to the starter 9.

Figure 2:
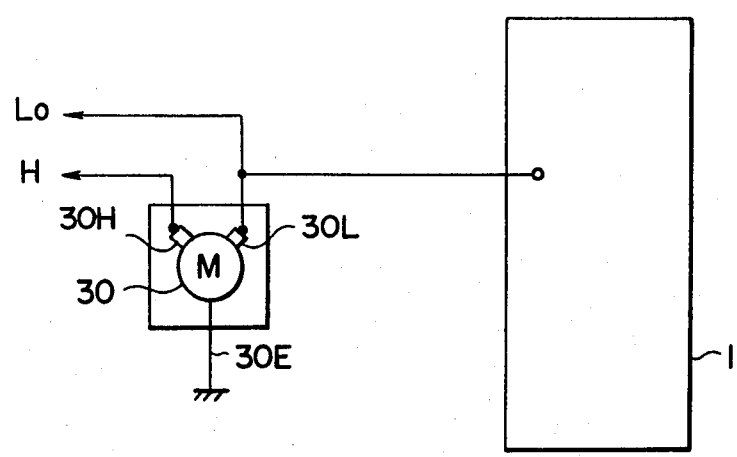
FIG. 2 is a block diagram showing the connection between the terminals of the wiper motor and the input terminal of the control circuit.

Description will hereunder be given of an embodiment of the circuit for detecting the operating condition of the wiper with reference to FIG. 2. In FIG. 2, designated at 30 is a wiper motor comprising a high terminal 30H for putting the wiper into a high speed motion, a low terminal 30L for putting the wiper into a low speed motion and a common earth terminal 30E. When a voltage is applied to the high terminal 30H, the wiper is operated in a high speed motion, and, when a voltage is applied to the lower terminal 30L, the wiper is operated in a low speed motion. In this wiper motor 30, if a voltage V is applied to the high terminal 30H for example, then a voltage half as much as the voltage V is output from the low terminal 30L. On the contrary, the voltage V is applied to the low terminal 30L, then a voltage as much as the voltage V is output from the high terminal 30H. Needless to say, these output voltages are generated in accordance with the construction and the characteristics of the motor 30. In general, when a voltage is applied to the high terminal 30H, a voltage lower than the voltage thus applied is output from the low terminal 30L. In consequence, if a voltage issued from either the low terminal 30L or the high terminal 30H of the wiper motor is detected on the basis of the above-described facts, then voltages are issued from both the terminals 30L and 30H, so that the operating condition of the wiper can be detected by the control circuit 1.

More specifically, the embodiment shown in FIG. 2 is constructed such that the low terminal 30L of the wiper motor 30 is connected to the input terminal of the control circuit 1, so that a voltage signal from the low terminal 30L of the wiper motor 30 is taken into the control circuit 1. When a voltage is issued from this terminal 30L, it is judged that the wiper is used, and consequently, the automatic engine stop by ERS is prevented. Needless to say, the low terminal 30L is replaceable by the high terminal 30H and a voltage from the high terminal 30H may be taken into the control circuit 1.

In this embodiment, only the low terminal 30L is connected to the input terminal of the control 1. However, when a voltage is applied to the high terminal 30H in order to drive the wiper motor 30 at high speed, a voltage of a certain value is ussed from the low terminal 30L to which no voltage is applied, so that the operating condition of the wiper can be detected by the control circuit. In consequence, while the wiper is used, the automatic engine stop by ERS can be prevented.

What is claimed is:

1. An automatic engine stop-restart system, comprising:

engine stop and restart means for automatically stopping an engine under a first predetermined condition and automatically restarting said engine under a second predetermined condition;

a two-speed type wiper motor having a low terminal and a high terminal, for driving a wiper; and control means connected to only one of said low terminal and said high terminal of said wiper motor, for judging an operation condition of said wiper in accordance with a signal from the connected terminal of said wiper motor and preventing said engine from being automatically stopped when said wiper is driven.

2. An automatic engine stop-restart system as set forth in claim 1, wherein said signal from said low terminal is fed to said control means.

3. An automatic engine stop-restart system as set forth in claim 1, wherein said signal from said high terminal is fed to said control means.

* * * * *